Patented Apr. 18, 1944

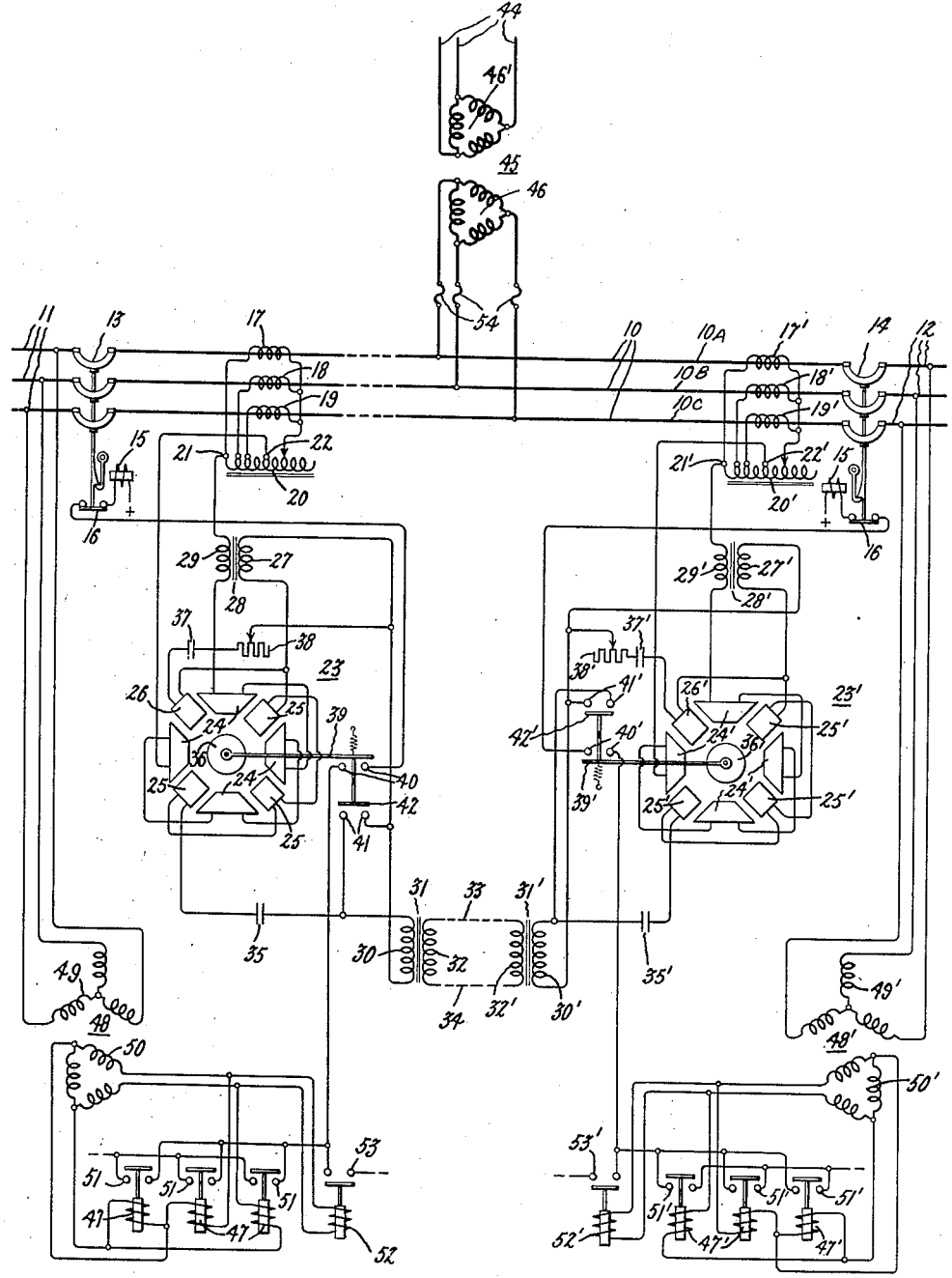

2,346,971

UNITED STATES PATENT OFFICE 2,346,971

ELECTRIC PROTECTIVE ARRANGEMENT

Luke F. Kennedy, Schenectady, N. Y., assignor to General Electric Company, a corporation of New York Application May 16, 1942, Serial No. 443,216

12 Claims. (Cl. 175—294)

My invention relates to electric protective arrangements for electric circuits and more particularly to such arrangements wherein pilot wires are employed.

Since the development of pilot-wire protective systems for polyphase circuits in which only two pilot wires are required, such as is disclosed in United States Letters Patent 2,273,588, granted February 17, 1942, upon an application of J. H. Neher and assigned to the same assignee as the present application, it has been possible to maintain continuity of service due to the discriminating action of such protective systems at a more reasonable cost and, hence, to a greater extent than was possible heretofore. It often is desirable to apply a pilot-wire protective system to a line having one or more tapped connections such as feeder connections, each including an electric translating apparatus such as a transformer bank. Where the capacity of the transformer bank is relatively low with respect to the line to be protected by the pilot wire protective system, it is not feasible for many reasons to use either relays or current transformers to completely balance the pilot-wire protective system. However, in such cases where no current transformers are used at the tap, a fault on the tapped side, which is usually the low-tension side of the transformer bank, appears as a line fault to the pilot-wire protective system and isolation of the line by the pilot-wire protective system might result even though no fault existed thereon.

Accordingly, it is an object of my invention to provide a protective system which overcomes the difficulty set forth above.

It is another object of my invention to provide a new and improved pilot-wire protective arrangement for a power line having a tapped connection including a transformer bank.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof illustrates diagrammatically an embodiment of my invention as applied to a line section 10 of an alternating-current power line which is illustrated as comprising a plurality of conductors 10A, 10B, and 10c, respectively. As shown, this power line section 10 extends between two stations schematically illustrated as line sections or buses 11 and 12, respectively. Power line section 10 is arranged to be connected with line sections or buses 11 and 12 through suitable circuit-interrupting means illustrated as latched closed circuit breakers 13 and 14, respectively. Each circuit breaker may be provided with a trip coil 15 and an auxiliary switch 16 of the "a" type, that is, one which is closed when the circuit breaker is closed and open when the circuit breaker is open.

While there are several forms of pilot-wire protective arrangements suitable for the protection of the line section 10 between circuit breakers 13 and 14, the particular form I have shown for the purpose of illustrating my invention is substantially identical with that disclosed and claimed in the above-mentioned Neher patent.

As shown, this pilot-wire protective system comprises two relaying stations at each end of line section 10, each comprising identical apparatus and, hence, only that at the left-end of the line section 10 will be described while the corresponding parts of the apparatus at the other end will be designated by the same reference numerals marked with a prime. Referring now to the left-hand end of the line section 10, I have illustrated a plurality of single-phase equal-ratio current transformers having secondary windings 17, 18 and 19, associated with the respective phase conductors of line section 10. These secondary windings are connected to a summation transformer 20 having output terminals 21 and 22 across which a single-phase relaying current is obtained, which has a known relationship with respect to the currents flowing in the respective phase conductors of line section 10. Under most normal conditions of line section 10, a relatively small current will be obtained across output terminals 21 and 22 of summation transformer 20 which current may change in the event of a ground or phase fault on line section 10. The relaying current obtained across terminals 21 and 22 of autotransformer 20 is utilized to energize an electroresponsive device or relay of the wattmetric type, generally indicated at 23, comprising a plurality of polarizing windings 24, a plurality of operating windings 25 and a restraining winding 26. The polarized windings 24 are serially connected with the output of summation transformer 20.

Since the torque in a wattmetric type of relay is proportional to the product of the fluxes produced by the different windings multiplied by the sine of the angle between the fluxes, it will be understood by those skilled in the art that the maximum torque is obtained when these fluxes differ in phase by ninety electrical degrees. Accordingly, the operating windings 25 are serially connected across the secondary winding 27 of a high-reactance transformer 28 which may be an air-gap transformer having its primary winding 29 connected in series with the output of summation transformer 20. The circuit including operating windings 25 is illustrated as including the primary winding 30 of a suitable insulating transformer 31 having a secondary winding 32. The secondary windings 32 and 32' of insulating transformers 31 and 31' at each of the relaying stations at the respective ends of line section 10 are connected in opposed voltage relationship through a pair of pilot wires 33 and 34 so that, with equal outputs from summation transformers 20 and 20', substantially no current will flow in pilot wires 33 and 34. It will be understood by those skilled in the art that, under certain conditions, insulating transformers 31 and 31' will not be necessary.

A suitable capacitor 35 is preferably connected in series with operating windings 25 of relay 23 in order to neutralize the inductance of the pilot-wire circuits and of windings 25, thereby producing a substantially in-phase current in the circuit including the pilot wires and windings 25 to maintain the ninety-degree relationship between the currents flowing in operating windings 25 and polarizing windings 24. The interaction of the fluxes produced by windings 24 and 25, as will be understood by those skilled in the art, produces an operating torque in relay 23 tending to rotate a cup-shaped rotor 36 in a clockwise direction.

In order to prevent relay 23 from operating upon the occurrence of extremely heavy currents flowing through line section 10 due to overloads or to faults outside of the protected section, relay 23 is arranged so as to operate upon a predetermined percentage of unbalance between the line currents at the two ends of line section 10, that is, relay 23 responds to a percentage or ratio represented by the difference between the line currents at the two ends of the protected line section 10 divided by the smaller of these line currents. Under heavy through fault current conditions, the difference between the currents at both ends of the protected section 10 should be zero. Actually such perfect balance is not possible, particularly under high current conditions which may cause the current transformers having secondary windings 17, 18, 19, and 17', 18', and 19' to approach saturation in different degrees, resulting in discrepancies in the current transformer ratios at the two ends of the protected line section. The significance of this is that, if relay 23 responds to a predetermined amount of unbalance of current between the two ends of line section 10, it might be operated when an extremely heavy current flows through the protected section, whereas, if relay 23 operates upon a predetermined percentage of unbalance, it will be affected to a much lower degree by the difference in the characteristics of the current transformers or by any causes resulting in a comparatively small current unbalance as compared to the actual currents flowing at the moment.

This percentage characteristic is obtained by means of restraining winding 26 on relay 23, which is connected across the secondary winding 27 of high-reactance transformer 28. Restraining winding 26, in conjunction with polarizing windings 24, tends to produce a restraining torque on rotor 36 of relay 23, thus tending to rotate rotor 36 in a counterclockwise direction.

A suitable capacitor 37 is preferably connected in series with restraining winding 26 to neutralize the inductance of this circuit so that maximum torque may be produced by virtue of the ninety-degree relationship between the fluxes produced by restraining winding 26 and polarizing winding 24. In order to predetermine the percentage unbalance that must obtain before relay 23 can operate, an adjustable resistance 38 is provided to control the amount of current which can flow through restraining winding 26, thereby controlling the restraining torque of relay 23 and, consequently, the percentage characteristic thereof.

In order that relays 23 and 23' may control their associated circuit breakers 13 and 14, respectively, the rotors 36 and 36' thereof are provided with suitable switches 39 and 39', respectively, adapted to bridge the associated contacts 40 and 40' so as to energize the tripping coils 15 of circuit breakers 13 and 14, respectively.

In the event that the relaying current at one end of the line section 10 should be insufficient to cause operation of the relay at that end under certain fault conditions even though the relay at the other end causes tripping of its associated circuit breaker, relays 23 and 23' are provided with additional contacts 41 and 41', respectively, which are arranged to short-circuit the pilot wires 33 and 34 whenever bridged by switching means 42 and 42', respectively. The short circuiting of the pilot wires by one of the relays 23 or 23' will cause immediate operation of the relay at the opposite end and tripping of the associated circuit breaker without depending upon sequential tripping of the circuit breakers, the time required for the isolation in such a case being increased only by the operating time of the second relay.

The pilot-wire protective system described thus far is not my invention but is disclosed and claimed in the above-mentioned Neher patent.

The operation of this pilot-wire protective system will be well understood by those skilled in the art and no further description will be included here in view of the detailed description set forth in the above-mentioned Neher patent.

In the drawing, I have illustrated line section 10 as including a feeder tap 44 connected to line section 10 through an electric translating apparatus generally indicated at 45 and circuit-interrupting devices indicated as fuses 54. Electric translating apparatus 45 usually comprises a delta-Y or a delta-delta transformer and, in the drawing, I have illustrated both the primary winding 46 and the secondary winding 46' as delta connected. Since the capacity of transformer 45 connected to line 10 is quite often relatively low with respect to the capacity of the line, it is economically impractical to provide the additional current transformers and circuit breakers necessary to include this in the relaying circuit of the pilot-wire protective system and, furthermore, many of the well-known pilot-wire protective systems are not well adapted for applications in which more than two relaying stations are involved. Accordingly, feeder 44 or tapped connection 44 is protected only by fuses 54.

A fault on the secondary side of transformer 45 although involving relatively low currents in so far as line section 10 is concerned would look like a line fault to the pilot-wire protective system described heretofore, and consequently, isolation of line section 10 would result. To prevent such undesirable isolation of line section 10 is the main concern of the present invention. I have discovered that faults occurring on line section 10 would cause a great reduction in voltage of the conductors affected so that the maximum voltage under such fault conditions might be only about thirty per cent of normal. On the other hand, for faults on the secondary side of a low-capacity transformer bank tapped from a high capacity line section, the voltage of the line section seldom drops below sixty per cent of normal. Consequently, if the voltage condition of line section 10 is considered in addition to the indication afforded at the relaying stations of a pilot-wire protective system, it will be possible to prevent isolation of line section 10 in those cases when a fault occurs on the low side of the transformer bank tapped off the line section.

Accordingly, I provide a plurality of undervoltage relays 47, each energized with one of the line-to-line potentials of line section 10 through potential transformer 48 having a Y-connected primary winding 49 and a delta-connected secondary winding 50. Similar apparatus is placed at each end of line section 10, and in accordance with the procedure followed heretofore, the circuits and apparatus at the right-hand end of line section 10 are designated with the same reference numerals marked with a prime. Each of the undervoltage relays 47 controls contacts 51 connected in parallel with one another, which parallelly connected contacts 51 in turn are connected in series with the contacts 40 of the electroresponsive device 23 in the trip circuit of circuit breaker 13. With this arrangement, the trip circuit of circuit breaker 13 can be completed only if the voltage on line section 10 drops sufficiently to permit one or more of the relays 47 to close their contacts 51 and simultaneously that contacts 40 of electroresponsive device 23 are closed by switching member 29. Thus, isolation of line section 10 would not occur through a fault on the low side of the transformer bank tapped from line section 10 since, even though the pilot-wire protective system would cause contacts 40 and 40' to be bridged nevertheless the voltage of line section 10 would not drop sufficiently to permit one or more of the undervoltage relays 47 and 47' to drop out and close their contacts 51 and 51', respectively.

Since the tapped transformer banks, such as 45, are usually connected delta-delta or delta-Y, a single line-to-ground fault on the low tension side will not cause any zero-sequence current to flow in line section 10. However, since the system with which line section 10 is connected is usually a grounded system and perhaps a system grounded through a high impedance, a single line-to-ground fault might not produce a sufficient drop in voltage to permit one or more of the relays 47 or 47' to drop out and close their contacts 51 and 51', respectively. It is desirable, however, that line section 10 be isolated under such a line-to-ground fault condition thereon, and, to this end, I provide a zero-sequence voltage relay or, as illustrated in the drawing, a zero-sequence current relay 52 at the relaying station at the left end of the line section 10, and correspondingly, a zero-phase sequence current relay 52' at the relaying station at the right end of the line section 10. Preferably, the windings of zero-sequence current relays 52 and 52' are energized by being connected in the delta secondary winding 50 and 50', respectively, of potential transformer 48 and 48'. Whenever a zero-sequence current flows in line section 10, relays 52 and 52' will be energized to close their contacts 53 and 53', respectively, which are connected in series with the corresponding contacts of electroresponsive devices 23 and 23' in the trip circuits of the circuit breakers 13 and 14, respectively. Whenever a single line-to-ground fault occurs on the low side of transformer bank 45, the delta-delta connection will prevent this current from flowing in line section 10 and, consequently, zero-sequence current relays 52 and 52' can only be energized when zero-sequence current flows in line section 10. Accordingly, isolation of line section 10 will occur only if an actual fault occurs on line section 10.

In view of the detailed description included above, the operation of my protective arrangement will be obvious to those skilled in the art and no further discussion will be included herewith.

While I have shown and described a particular embodiment of my invention, it will be apparent to those skilled in the art that changes and modifications may be made without departing from the spirit and scope of my invention. I, therefore, aim in the appended claims to cover all such changes and modifications.

What I claim as new and desire to secure by Letters Patent of the United States is:

1. In combination, a power line section for transmitting relatively high quantities of electric energy, a low-capacity circuit including an electric translating apparatus connected to said line section, fault-responsive protective means for said line section for causing isolation of said line section upon the occurrence of a fault thereon in dependence upon the vector difference between the currents entering and leaving the ends of said line section, and means for rendering said fault-responsive protective means ineffective to cause isolation of said line section unless the potential of said line section falls to a predetermined value whereby isolation of said line section will not occur when a fault exists on said low-capacity circuit.

2. In combination, a line section for carrying relatively high quantities of electric energy, an electric circuit for carrying relatively low quantities of electric energy including an electric translating apparatus connected to said line section, differential protective means for said line section for causing isolation of said line section upon the occurrence of a fault thereon in dependence upon the vector difference between the currents entering and leaving the ends of said line section, and voltage-responsive means for rendering said differential protective means ineffective to cause isolation of said line section unless the potential of said line section falls to a predetermined value to prevent isolation of said line section on faults occurring on said electric circuit connected to said line section.

3. In combination, a line section for carrying relatively high quantities of electric energy, an electric circuit for carrying relatively low quantities of electric energy connected to said line section, differential protective means for said line section for causing isolation of said line section upon the occurrence of a fault thereon in dependence upon the vector difference between the currents entering and leaving the ends of said line section, and means for rendering said differential protective means ineffective to cause isolation of said line section unless the potential of said line section falls to a predetermined value to prevent isolation of said line section in response to faults occurring on said electric circuit connected to said line section.

4. In combination, a line section for carrying relatively high quantities of electric energy, an electric circuit for carrying relatively low quantities of electric energy connected to said line section including a transformer having windings which preclude zero-phase-sequence currents due to ground faults on said circuit remote from said line section from flowing in said line section, means dependent upon the current flowing at the two ends of said line section for causing isolation of said line section upon the occurrence of a fault thereon, means for rendering said last-mentioned means ineffective to cause isolation of said line section unless the potential of said line section falls to a predetermined value, whereby isolation of said line section on faults occurring on said electric circuit connected to said line section is prevented, and means responsive to zero-sequence quantities existing in said line section for rendering said first-mentioned means effective to cause isolation of said line section even though the voltage of said line section has not fallen to said predetermined value.

5. In combination, a line section for carrying relatively high quantities of electric energy, an electric circuit for carrying relatively low quantities of electric energy including an electric translating apparatus connected to said line section, pilot wire protective means for said line section for causing isolation of said line section upon the occurrence of a fault thereon in dependence upon the vector difference between the currents entering and leaving the ends of said line section, and voltage-responsive means for rendering said pilot wire protective means ineffective to cause isolation of said line section unless the potential of said line section falls to a predetermined value to prevent isolation of said line section on faults occurring on said electric circuit connected to said line section.

6. In combination, a line section for carrying relatively high quantities of electric energy, an electric circuit for carrying relatively low quantities of electric energy connected to said line section including a transformer having a delta connected winding which precludes zero-phase-sequence currents due to ground faults on said circuit remote from said line section from flowing in said line section, means dependent upon the current flowing at the two ends of said line section for causing isolation of said line section upon the occurrence of a fault thereon, means for rendering said last-mentioned means ineffective to cause isolation of said line section unless the potential of said line section falls to a predetermined value, whereby isolation of said line section on faults occurring on said electric circuit connected to said line section is prevented, and means responsive to zero-sequence quantities existing in said line section for rendering said first-mentioned means effective to cause isolation of said line section even though the voltage of said line section has not fallen to said predetermined value.

7. In combination, a line section for carrying relatively high quantities of electric energy, an electric circuit for carrying relatively low quantities of electric energy connected to said line section including a transformer having a delta connected winding which precludes zero-phase-sequence currents due to ground faults on said circuit remote from said line section from flowing in said line section, differential protective means dependent upon the current flowing at the two ends of said line section for causing isolation of said line section upon the occurrence of a fault thereon, means for rendering said differential protective means ineffective to cause isolation of said line section unless the potential of said line section falls to a predetermined value, whereby isolation of said line section on faults occurring on said electric circuit connected to said line section is prevented, and means responsive to zero-sequence current flowing in said line section for rendering said first mentioned means effective to cause isolation of said line section even though the voltage of said line section has not fallen to said predetermined value.

8. In combination, a line section for carrying relatively high quantities of electric energy, an electric circuit for carrying relatively low quantities of electric energy connected to said line section including an electric translating device, the capacity of said electric circuit relative to said line section being such that faults on said electric circuit will cause a relatively small drop in potential of said line section as contrasted with faults occurring on said line section, means dependent upon the current flowing at the two ends of said line section for causing isolation of said line section upon the occurrence of a fault thereon, and means for rendering said last-mentioned means ineffective to cause isolation of said line section unless the potential of said line section falls to a value substantially below the potential which would exist on said line section due to a fault on said electric circuit, whereby isolation of said line section on faults occurring on said electric circuit connected to said line section is prevented.

9. In combination, a line section for carrying relatively high quantities of electric energy, an electric circuit for carrying relatively low quantities of electric energy connected to said line section including a transformer having a delta-connected winding, the capacity of said electric circuit relative to said line section being such that faults on said electric circuit will cause a relatively small drop in potential of said line section as contrasted with faults occurring on said line section with the possible exception of single line-to-ground faults on said line section, differential protective means dependent upon the current flowing at the two ends of said line section for causing isolation of said line section upon the occurrence of a fault thereon, and means for rendering said differential protective means ineffective to cause isolation of said line section unless the potential of said line section falls to a predetermined value substantially below the potential which would exist on said line section due to a fault on said electric circuit, whereby isolation of said line section on faults occurring on said electric circuit connected to said line section is prevented, and means for permitting isolation of said line section upon the occurrence of a single line-to-ground fault thereon through operation of said differential protective means even though the potential of said line section has not fallen to said predetermined value.

10. In combination with a line section, differential protective means for said line section operative in dependence upon the vector difference between the currents entering and leaving said line section for causing isolation of said line section with respect to an associated electric system upon the occurrence of a fault on said section, and means for rendering said differential protective means ineffective to cause isolation of said line section unless the potential of said line section falls to a predetermined value.

11. In an electric system including a line section, differential protective means for said line section operative in dependence upon the vector difference between the currents entering and leaving said line section for causing isolation of said line section with respect to said system upon the occurrence of a fault on said section, and voltage-responsive means for rendering said differential protective means ineffective to cause isolation of said line section unless the potential of said line section falls to a predetermined value.

12. In an electric system including a line section, protective means for said line section dependent upon a predetermined relationship between predetermined electric quantities existing at different points of said section for causing isolation of said line section with respect to said system upon the occurrence of a fault on said section, and means for rendering said fault-responsive protective means ineffective to cause isolation of said line section unless the potential of said line section falls to a predetermined value at one of said predetermined points.

LUKE F. KENNEDY.